April 9, 1957  J. P. KITSELMAN  2,787,895
UNIVERSAL JOINT
Filed Jan. 29, 1952  2 Sheets-Sheet 1
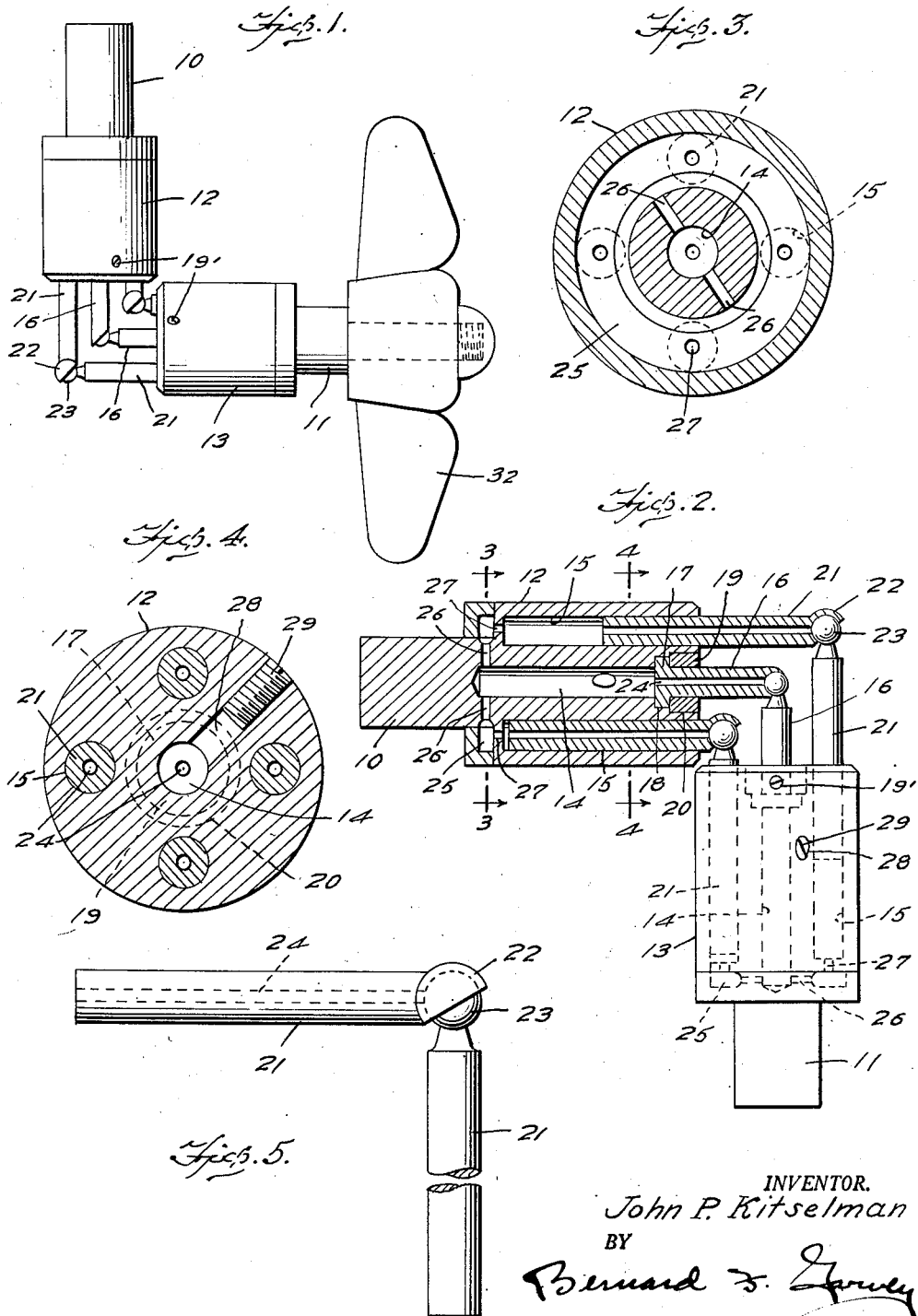
INVENTOR.
John P. Kitselman
BY
Bernard F. Garvey
ATTY.

April 9, 1957  J. P. KITSELMAN  2,787,895
UNIVERSAL JOINT

Filed Jan. 29, 1952  2 Sheets-Sheet 2

INVENTOR.
John P. Kitselman
BY
Bernard F. Garvey
ATTY

United States Patent Office 2,787,895
Patented Apr. 9, 1957

2,787,895

UNIVERSAL JOINT

John P. Kitselman, Peoria, Ill., assignor to Flexi-Versal Corporation, Peoria, Ill.

Application January 29, 1952, Serial No. 268,830

3 Claims. (Cl. 64—20)

This invention relates to universal joints or shaft couplings for transmitting motion from one shaft to another at different angles and also at changeable angles.

A general object of the invention is to provide a joint or coupling of the type above referred to that is more commercially feasible or practicable than those constructed previous to my invention.

Among the more specific objects of the invention is the provision of a universal joint which will maintain accurate operation at all angles, affords the maximum possible angular relation between the shafts, and wherein the shafts are subjected to a minimum of strain when in operation.

Another specific and very salient feature of the invention is the provision of improved means of lubrication whereby oiling of the ball and socket connection of the joints between the ends of the connected shafts is also provided for.

The device of the present invention is especially adapted for use with outboard motors because a much higher R. P. M. is available than with the conventional bevel gear transmission; further because a smaller torpedo or housing for the universal is provided, the torpedo passing through the water ahead of the propeller to form a tunnel of air with the result that only the outer periphery of the propeller impinges the water, and because trimming the boat by changing the angle of driving pitch of the propeller, while in motion, with the result that the aft end of the boat can be planed and then changed to obtain the maximum speed while in motion.

The invention, together with its objects and advantages, will be best understood by reading the following detailed description with reference to the accompanying drawings in which is illustrated the presently preferred embodiments of the invention, and wherein:

Fig. 1 is a plan view of one embodiment of the improved universal joint or shaft coupling of this invention, and illustrating an application thereof to an outboard motor;

Fig. 2 is a plan view of the embodiment shown in Fig. 1, and with the joint shown partly in section and partly in elevation;

Figure 6:
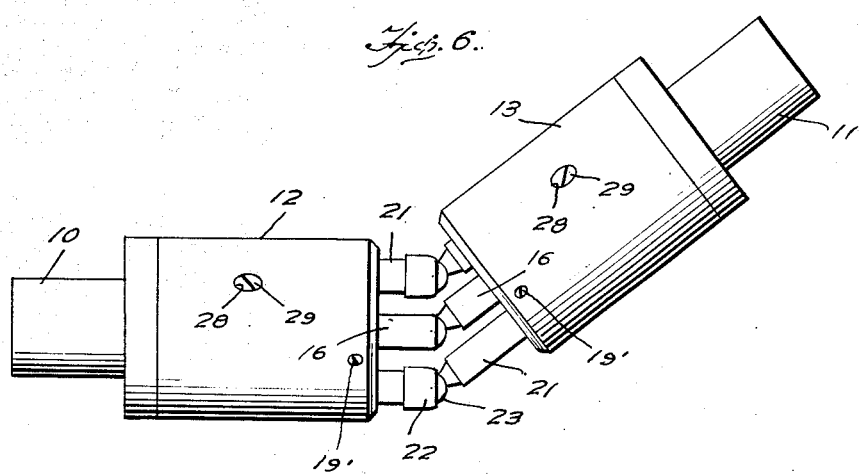
Figure 7:
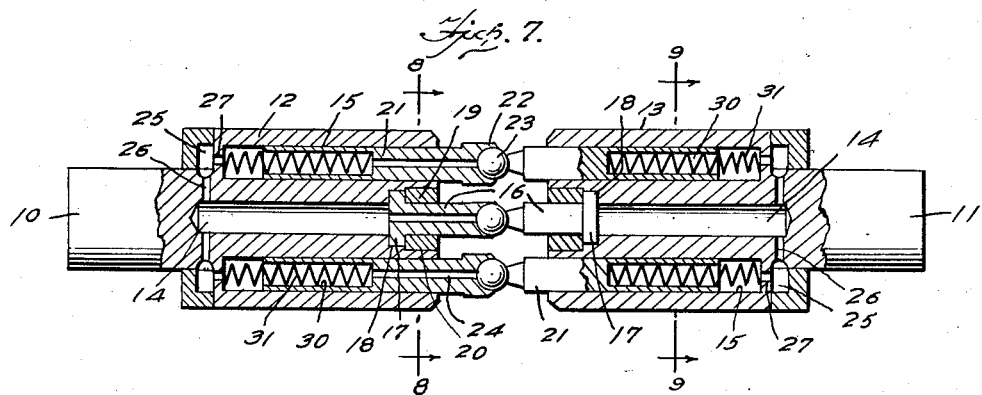
Figure 8:
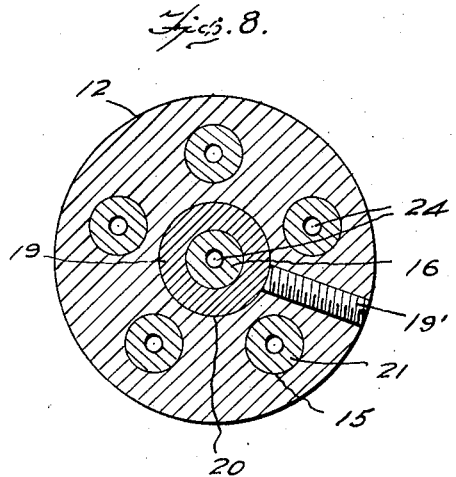
Figure 9:
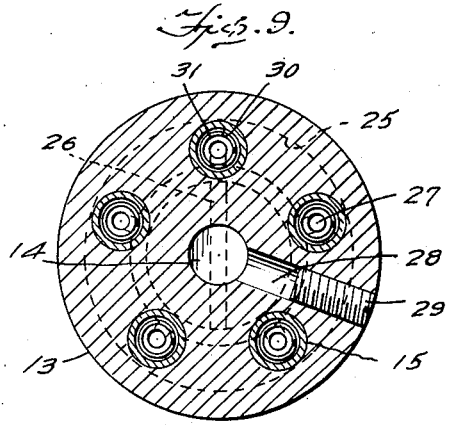

Figs. 3 and 4 are transverse sectional views taken substantially on lines 3—3 and 4—4, respectively, of Fig. 2;

Fig. 5 is a detail view of a pair of rods jointed in accordance with this embodiment of the invention;

Fig. 6 is a plan view of a second embodiment of this invention;

Fig. 7 is a longitudinal sectional view of the universal joint shown in Fig. 6, and Figs. 8 and 9 are transverse sectional views taken substantially on lines 8—8 and 9—9, respectively, of Fig. 7.

With more particular reference to the drawings, 10 and 11 designate two similar shafts that are respectively provided with enlarged cylindrical head portions 12 and 13.

In each embodiment of the invention, each shaft 10 and 11, at the head-equipped end thereof is provided with an axial bore 14, and each shaft head 12 and 13 is provided with a plurality of circumferentially spaced bores 15 parallel to the axes of the respective shafts 10 and 11.

Each axial bore 14 has the inner end of a relatively short rod 16 secured therein near the extremity of each shaft 10 and 11. Each rod 16 is held against movement relative to its shaft by means of a flange 17 formed at the inner end of the rod and securely clamped between a shoulder 18 formed internally of the bore 14 and a retaining collar 19 detachably engaged, by a binding screw 19', in a recess or counterbore 20 at the outer extremity of bore 14.

Each bore 15 has a rod 21, of a length greater than that of rod 16, slidably disposed therein.

The rods 21 in the two head portions 12 and 13 are paired, and the outer or opposed ends of each pair of rods 21, and also the outer or opposed ends of the center rods 16, are ball-jointed or connected with each other so that they can be relatively moved angularly but cannot be separated or moved apart, as hereinafter more fully described.

In each embodiment of the invention, each rod 21 and the center rod 16 associated with the head portion of one of the shafts, e. g., the head portion 12 of shaft 10 are provided at the outer ends thereof with sockets 22 that receive balls 23 formed integrally with the outer ends of the rods 21 and center rod 16 associated with the head portion of the other of the shafts, in this instance the head portion 13 of shaft 11.

In the embodiment of the invention shown in Figs. 6 and 7, the sockets 22 therein illustrated are coaxial with the rods 21 and 16, respectively. Hence with this ball and socket connection the minimum possible angular deflection between the shafts is 38°. In the embodiment of the invention shown in Figs. 1 and 2 the sockets therein illustrated have the open sides thereof disposed obliquely with respect to the axes of the associated rods. Hence, with this form of ball and socket connection a wider range of angular deflection between the shafts than has heretofore been possible for constructional reasons is permitted, the angular deflection between the shafts with this form of socket ranging from a minimum possible angular deflection of 30° to a maximum possible angular deflection of 95°.

As previously stated, another very salient and characteristic feature of this invention is the provision of improved means of lubrication whereby oiling of the above-described ball and socket connections providing a driving relation between the shafts is effected simply and efficiently. To that end, and as shown, in each embodiment of the invention the socket-equipped rods 21 and 16 are provided with longitudinal bores or conduits 24 that at one end open into the sockets and at the opposite end open into the bores 14 and 15. The bores 14 in the heads 12 and 13 serve as reservoirs for lubricant, and these bores 14 are in communication with the bores 15 through the medium of annular chambers 25 provided in the heads 12 and 13, ducts 26 connecting the chambers 25 with the bores 14 and ducts 27 connecting the chambers 25 with the bores 15. For the reservoir-bores 14 there are suitably provided filling openings 28 and closure plugs 29 for said openings. As is believed to be clearly understood, the rods 21 are freely movable endwise in the head portions 12 and 13, the rods 21 sliding in sequence and revolving about the center rods 16 as the jointed shafts 10 and 11 revolve. During this endwise movement of the rods 21, the lubricant in the head portions 12 and 13 is caused to flow between the bores 14 and 15 in each head portion and to and fro through the bores 24 of the rods 21 and 16 associated with the head portion 12 for feeding lubricant to the ball and socket connections. Thus, complete and thorough lubrication, including lubrication of the ball and socket joints, is assured.

Where a ball and socket joint, such as shown in Figs. 6 and 7, is employed, the rods 21 or portions of the lengths thereof are hollowed out to provide sockets 30 which accommodate coil springs 31 that serve to maintain the sockets 22 and balls 23 in this form of the invention in positive engagement irrespective of the positions of the rods 21.

Both of the universal joints herein disclosed operate in substantially the same manner. In each embodiment of the invention, the rods 21 slide in sequence and revolve about the center rods 16 as the coupled shafts revolve; the ball and socket connections of the paired rods 21 and of the center rods 16 permitting adjustment of the respective shafts to any angle and to changeable angles, constituting a universal joint shaft coupling. It will also be appreciated that the coupling contemplated by this invention takes advantage of the oscillating motion of the rods 21 in their bores 15 to force a circulation of lubricant over the working parts and particularly insures complete and thorough lubrication of the ball and socket joints. Consequently, both of the universal joints herein disclosed can be operated at high speeds without substantial noise as the oscillating rods therein will move smoothly in evenly balanced relation and in well lubricated condition.

In Fig. 1 I have illustrated an application of this invention to an outboard motor, the propeller 32 of which is disposed at right angles to the shaft 11 and in a plane parallel to the shaft 10. The shaft 10 will be engaged with the source of power while the shaft 11 carries the propeller on its outer terminal after the fashion shown in Fig. 1. It has been found that with the shafts 10 and 11 at right angles, as shown in Fig. 1, the propeller may be advantageously operated as well as at any intermediate angle to obtain the results contemplated in the objects of the invention herein set out.

While the invention has been described in detail in its presently preferred embodiments, it will of course be understood that such has been done for purposes of illustration only and not by way of limitation, and therefore only such limitations are to be imposed thereon as may reasonably come within the scope of the appended claims.

What I claim is:

1. In a universal joint, a pair of shaft ends each having an axial bore and a plurality of circumferentially spaced bores, a fixed rod extending from the axial bore of each shaft, a ball and socket connection between the fixed rods, reciprocating rods extending from each of the circumferentially spaced bores, ball and socket connections between the pairs of rods in corresponding circumferentially spaced bores, the fixed rod and the reciprocating rods of one shaft end being provided with a lubricant duct leading to a ball and socket connection, and conduit connections between the axial bore and the peripheral bores in each shaft end, whereby advantage is taken of the reciprocating motion of the rods in their bores to force feed lubricant to all of the ball and socket connections between the rods.

2. In a universal joint, a pair of shaft ends each having an axial bore and a plurality of circumferentially spaced bores, a fixed rod extending from the axial bore of each shaft, a ball and socket connection between the fixed rods, reciprocating rods extending from each of the circumferentially spaced bores, ball and socket connections between the pairs of rods in corresponding circumferentially spaced bores, and springs within the circumferentially spaced bores to maintain the sockets and balls in positive engagement.

3. In a universal joint a pair of shaft ends each having an axial bore and a plurality of circumferentially spaced bores, a fixed rod extending from the axial bore of each shaft, a ball and socket connection between the fixed rods, reciprocating rods extending from each of the circumferentially spaced bores, ball and socket connections between the pairs of rods in corresponding circumferentially spaced bores, the fixed rod and the reciprocating rods of one shaft end being provided with a lubricant duct leading to a ball and socket connection, and a lubricating agent contained in the axial and peripheral bores of each shaft end for reducing friction between the peripheral bores and the reciprocating shafts and for force feeding lubricant to all of the ball and socket connections through said lubricant duct.

References Cited in the file of this patent

UNITED STATES PATENTS

| | | |
|---|---|---|
| 1,139,631 | Blakely | May 18, 1915 |
| 1,166,401 | Faltin | Dec. 28, 1915 |
| 1,896,133 | Chilton | Feb. 7, 1933 |
| 1,952,341 | Ude | Mar. 27, 1934 |
| 2,218,303 | Smith | Oct. 15, 1940 |
| 2,361,046 | Molly | Oct. 24, 1944 |
| 2,485,893 | Kost | Oct. 25, 1949 |